United States Patent [19]

Grove

[11] 3,957,246
[45] May 18, 1976

[54] GATE VALVE AND METHOD OF MANUFACTURE

[75] Inventor: Marvin H. Grove, Houston, Tex.

[73] Assignee: M & J Valve Company, Houston, Tex.

[22] Filed: May 15, 1975

[21] Appl. No.: 577,913

Related U.S. Application Data

[62] Division of Ser. No. 441,328, Feb. 11, 1974, Pat. No. 3,905,082.

[52] U.S. Cl. .............................. 251/329; 251/366
[51] Int. Cl.² .................... F16K 27/04; F16K 27/10
[58] Field of Search ........................... 251/329, 366

[56] References Cited
UNITED STATES PATENTS

| | | | |
|---|---|---|---|
| 3,386,151 | 6/1968 | Combes | 29/157.1 R |
| 3,415,489 | 12/1968 | Gray | 251/329 |
| 3,460,224 | 8/1969 | Combes et al. | 29/157.1 R |
| 3,638,908 | 2/1972 | Grove | 251/329 |

*Primary Examiner*—Arnold Rosenthal
*Attorney, Agent, or Firm*—Flehr, Hohbach, Test, Albritton & Herbert

[57] ABSTRACT

A gate valve having a body made in two parts, namely a main part having flow passages and at least one body extension that accommodates movement of the gate between open and closed positions. The extension is generally rectangular as viewed from one end of the valve, and has outwardly bulged end walls as viewed from one side of the valve. The end walls are concave as viewed from the inside of the body. Also a method of manufacturing such a valve involving fabrication of a box-like structure with welding applied in particular manner, after which hydraulic pressure is applied internally to pressure form the end walls of the structure to the desired configuration.

2 Claims, 15 Drawing Figures

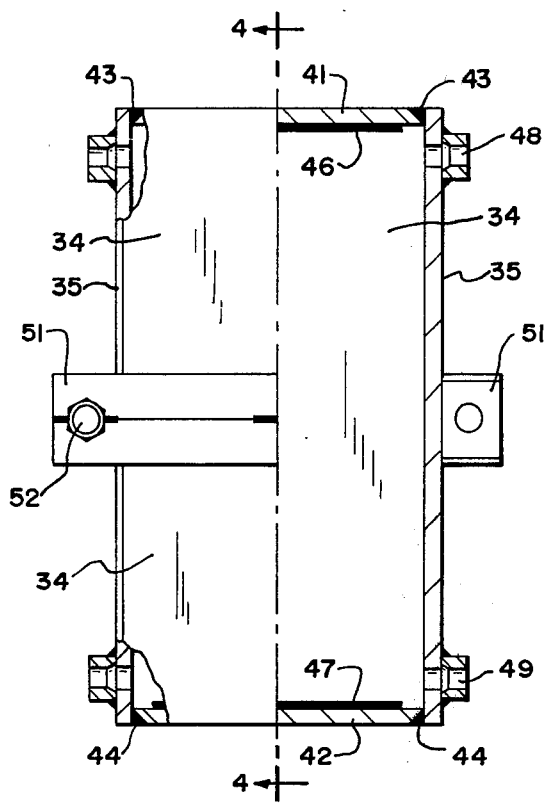
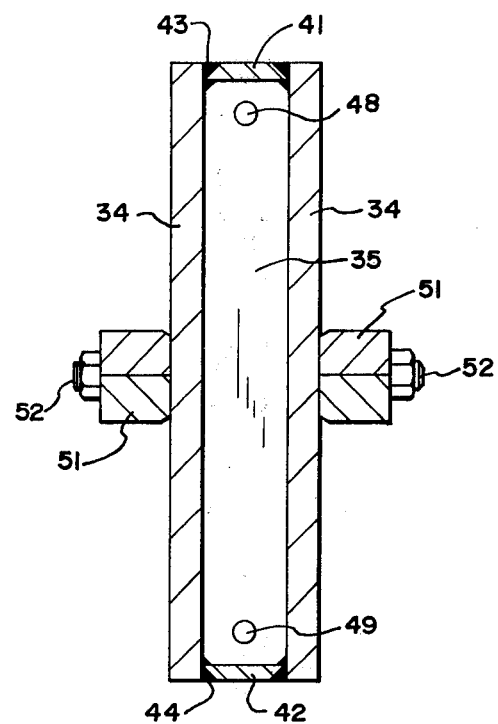
FIG.-3      FIG.-4
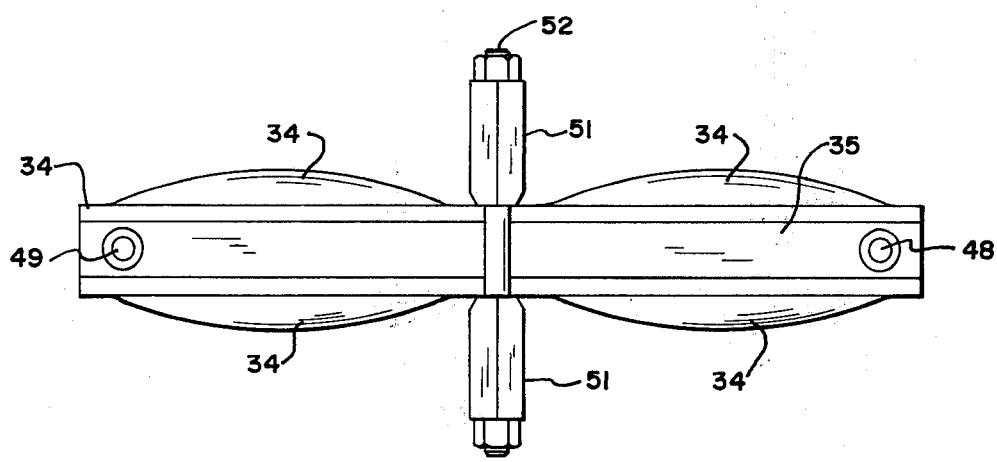
FIG.-5

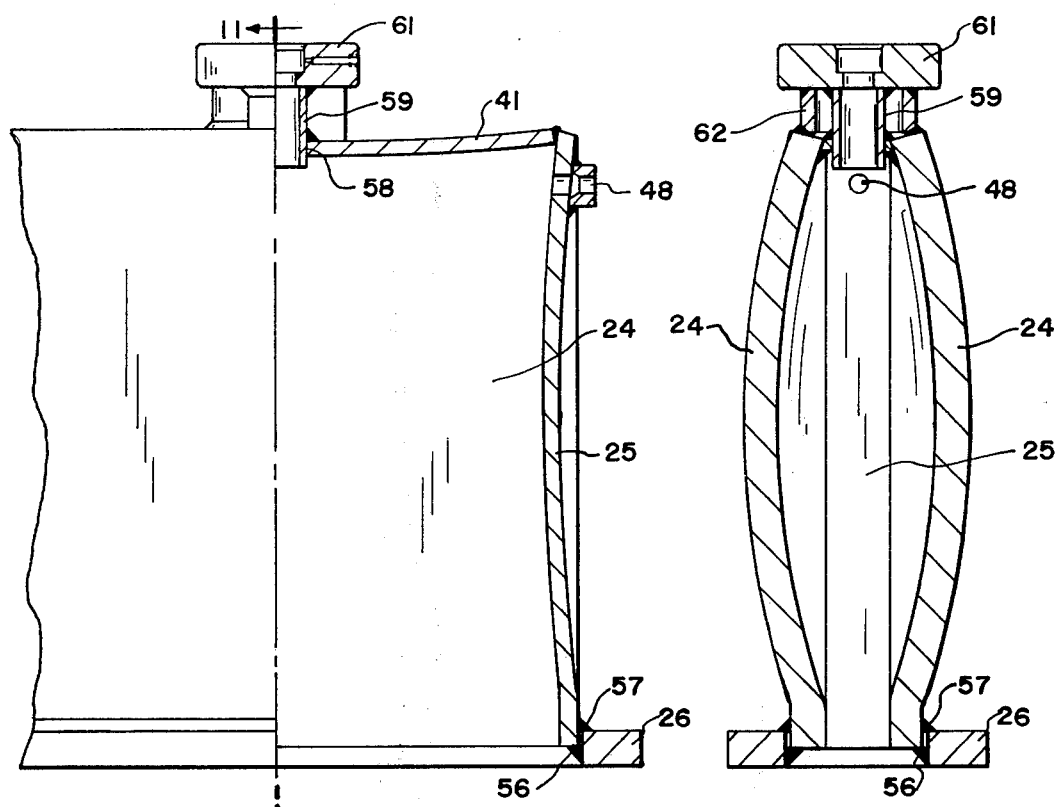
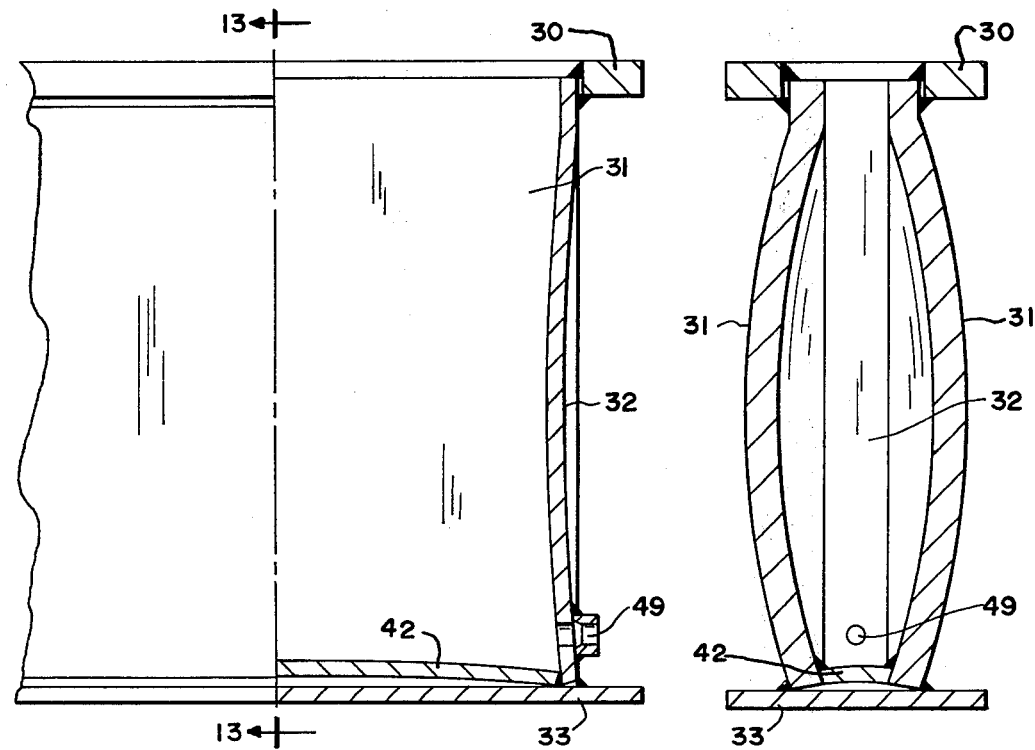

GATE VALVE AND METHOD OF MANUFACTURE

This is a division of application Ser. No. 441,328 filed Feb. 11, 1974, now U.S. Pat. No. 3,905,082.

BACKGROUND OF THE INVENTION

This invention relates generally to the construction of gate valves of the fabricated type and to methods for their manufacture.

Gate valves when made in the larger sizes frequently have bodies fabricated by welding from steel mill shapes such as plates, channels or angles. The main body part, which connects with associated piping and carries the sealing assemblies, must be made sufficiently strong to withstand line pressures and also stresses applied by the connecting piping. When the valve is of the through port type, in which the gate has a port which is aligned with the flow passages of the valve body for open valve position, there are upper and lower extensions of the body which are either integral with the main body part, or separately fabricated and secured to the main body part. Such extensions accommodate movement of the valve gate between full open and closed positions. When the valve is not of the through port type, and employs a relatively short gate, only an upper body extension is provided, which has bonnet means serving to carry a manual or power operator. Whether the body has one or two body extensions, it is evident that these extensions must be constructed in such a manner as to withstand the line pressure as a pressure vessel. When one or both body extensions have the same configuration as the main body part, as for example, a box that is rectangular in section, it must be made with relatively heavy end walls or with reinforcing ribbing associated with the end walls to withstand internal line pressure, thus increasing weight and cost of manufacture. As shown in U.S. Pat. No. 3,372,903, the upper body extension may be a separate structure that is dome-shaped or cylindrical to more nearly approximate a theoretical ideal pressure vessel. This makes possible thinner walls and a saving in weight. However, such dome-shaped or cylindrical extensions are relatively expensive to manufacture and to mount upon the main body part.

In some instances body extensions of large sized valves have been pressure formed during manufacture to approximate a spherical pressure vessel. Such body extensions may have end walls that correspond to segments of a sphere, with curved peripheral edges welded to curved side walls. While such extensions may provide desirable pressure resisting requirements for a given weight, the width as measured horizontally is substantially greater than the width of the main part of the body, whereby a valve making use of such an extension has a bulky configuration which may be undesirable in many installations. In addition, the fabrication of such extensions requires special welding operations which differ from the relatively simple welding operations normally used in the fabrication of gate valves.

SUMMARY OF THE INVENTION

It is a general object of the invention to provide a gate valve construction which has at least one body extension that approximates an ideal pressure vessel, but which is relatively simple to manufacture and which does not provide an undesirable profile for the valve.

Another object of the invention is to provide a novel method for the manufacture of such valves, the method being characterized by a particular manner in which welds are applied to a box-like structure that is subsequently pressure formed.

Additional objects and features of the invention will appear from the following description in which the preferred embodiments have been set forth in detail in conjunction with the accompanying drawings.

DESCRIPTION OF THE DRAWINGS

FIG. 3 is an elevational view, partly in section, illustrating a structure that is fabricated in the course of manufacturing the body extensions.

FIG. 4 is a cross-sectional view taken along the line 4—4 of FIG. 3.

FIG. 5 is a side elevational view illustrating the structure of FIGS. 3 and 4 being formed by internal pressure.

FIG. 10 is an elevational view of the upper body extension, partly in section, after being pressure formed and after a mounting flange has been secured to the same.

FIG. 11 is a cross-sectional view taken along the line 11—11 of FIG. 10.

FIG. 12 illustrates the lower body extension in elevation, after being pressure formed, after a flange and a supporting foot have been applied.

FIG. 13 is a cross-sectional view taken along the line 13—13 of FIG. 12.

DESCRIPTION OF THE PREFERRED EMBODIMENT

Figure 1:
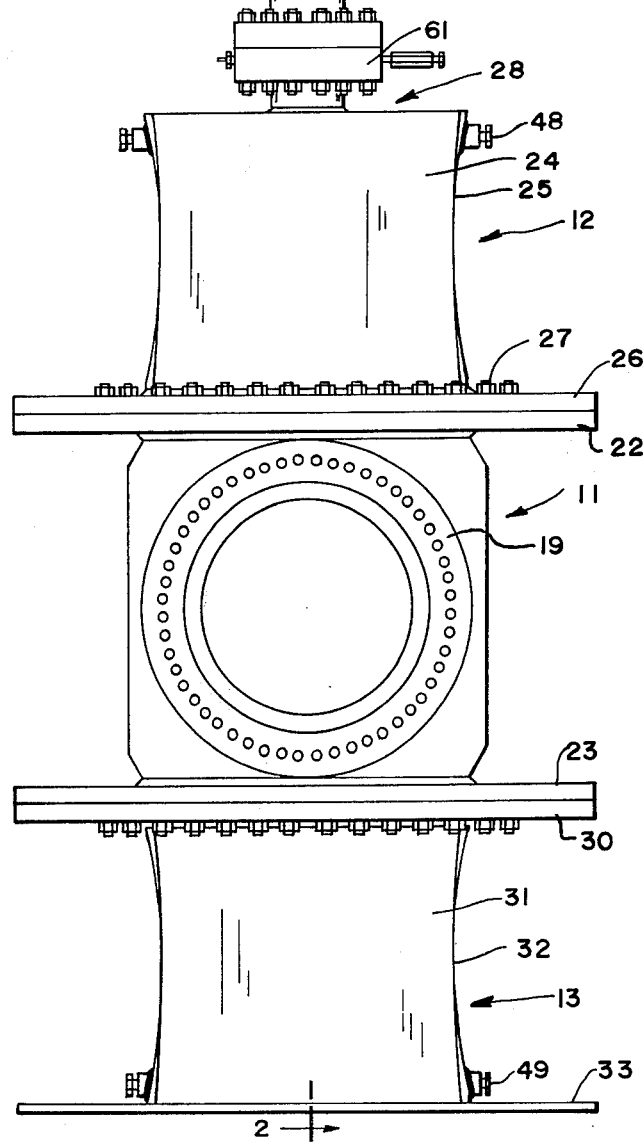
FIG. 1 is an end view in elevation, illustrating a gate valve of the through port type incorporating the present invention.
Figure 2:
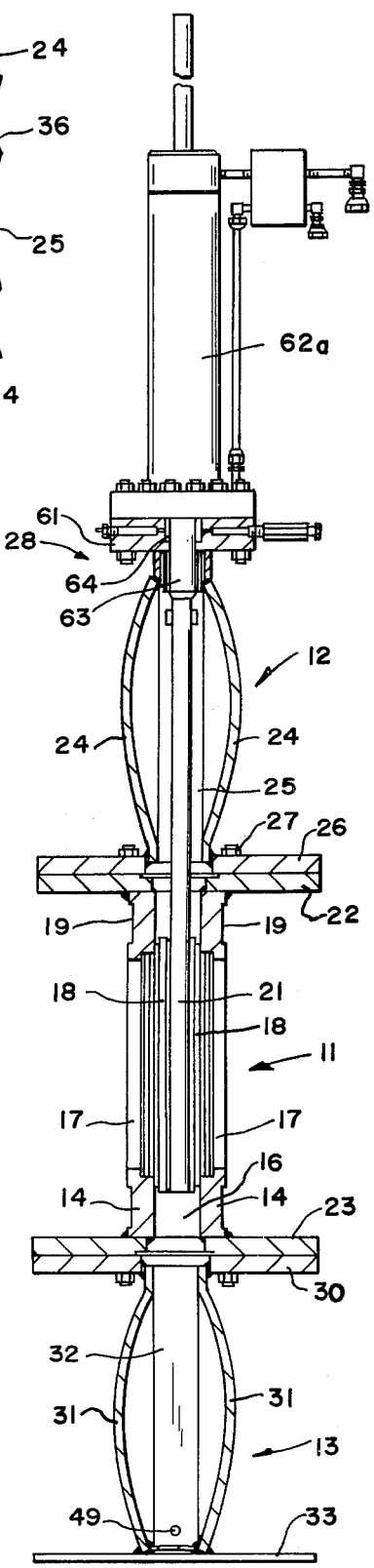
FIG. 2 is a section taken along the line 2—2 of FIG. 1, in elevation.

The gate valve illustrated in FIGS. 1 and 2 consists of a body which includes a main body part 11, the upper body extension 12, and the lower body extension 13. The main body part 11 can be a steel casting, or it may be fabricated as illustrated. Thus, flat end walls 14 have their side edges secured as by welding to the side walls 16. The end walls 14 are provided with openings 17 which provide fluid passageways. Also they are machined to provide recesses which accommodate the sealing assemblies 18. These assemblies may be constructed as shown in U.S. Pat. No. 3,269,695. Piping, hubs or transition pieces may be welded directly to the end walls 14, or machined facings 19 can be provided for mounting pipe flanges. A flat valve gate 21 is disposed between the sealing assemblies 18, and in this instance is provided with a port (not shown) which registers with the passageways 17 when the valve is in open position. Mounting flanges 22 and 23 are shown secured to the upper and lower extremities of the main body part 11, as by welding.

The upper and lower extensions 12 and 13 appear rectangular in configuration as viewed in FIG. 1, and are constructed in a special manner as will be presently explained. The upper extension includes the end walls 24 and side walls 25, secured together by welding, together with a mounting flange 26, which is secured to the flange 22 by bolting 27. Also the upper extension includes a bonnet assembly indicated generally at 28. The lower extension 13 includes the end and side walls 31 and 32, secured together by welding, together with the flange 30 and the welded on plate 33, which forms a foot for supporting the valve.

The end walls 24 and 31 of the upper and lower extensions 12 and 13 are bulged outwardly to conform generally to segments of a sphere.

Figure 14:
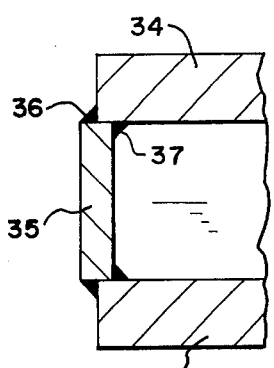
FIG. 14 is a detail in section illustrating the manner in which the end and side walls are originally welded together in forming the assembly of FIGS. 3 and 4.

The method used in the manufacture of the body extensions 12 and 13 can be described in connection with FIGS. 3 and 4. Preferably both extensions are made from a single fabricated structure which is pressure formed. The structure shown in FIGS. 3 and 4 consists of flat rectangular steel plates 34 having their longitudinal edges secured by welding to the side plates 35. Eventually plates 34 are severed to become walls 24 and 31, and plates 35 are severed to become walls 25 and 32. The plates 34 are substantially thicker and therefore more rigid than the plates 35. By way of example, the walls 34 may be made of suitable low yield steel plate 1½ inches thick, and the walls 35 may be made of steel plate three quarters of an inch thick. These walls may be secured together by welding in the manner shown in FIG. 14. Thus, the walls 35 may be offset outwardly with respect to the adjacent edges of the walls 34, and these parts are secured together by the external welds 36. Also internal welds 37 are applied.

Closure walls 41 and 42 (FIGS. 3 and 4) are welded to the ends of the structure. Thus, the edges of the plates forming these walls can be beveled as illustrated in FIG. 3, and external welding 43 and 44 applied. Also internal welding 46 and 47 is applied along the longitudinal edges of the plates 41 and 42, as shown in FIGS. 3 and 4. Here the welds are terminated short of the ends of the closure walls. To facilitate applying the welds 46 and 47, the ends of the structure are provided with access openings 48 and 49 through which welding equipment can be introduced to carry out a welding operation of the submerged arc type. Rigid clamping members 51 are applied across an intermediate portion of the structure, and are held in place by the clamping bolts 52. The clamps are positioned in accordance with the dimensions required for the body extensions. Thus assuming that the upper part of the extension is somewhat longer than the lower extension, the clamping members 51 are positioned accordingly.

After preparing the structures shown in FIGS. 3 and 4, and after applying the clamping members 51, the assembly is in condition for pressure forming. This can be carried out by closing the access openings 48 and 49, and connecting a tube leading to a suitable hydraulic pump. In pressure forming the interior of the structure is filled with a suitable liquid such as water, and then the interior pressure gradually increased by the pumping means whereby the walls 34 are bulged outwardly. This operation is continued until the walls 34 have been shaped to the extent desired. The structure immediately after such pressure forming appears as shown in FIG. 5.

After pressure forming the clamps 51 are removed, liquid drained from the structure, and the structure then severed into two parts corresponding to the upper and lower body extensions. The line of severance is generally along the center of the area engaged by the clamping members 51.

Figure 15:
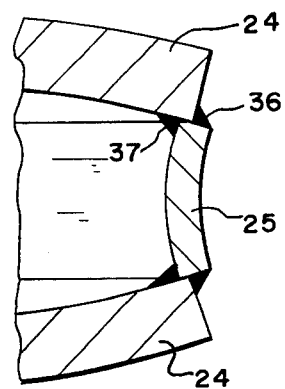
FIG. 15 is a detail in section showing the new configuration which is imparted by pressure forming.
Figure 6:
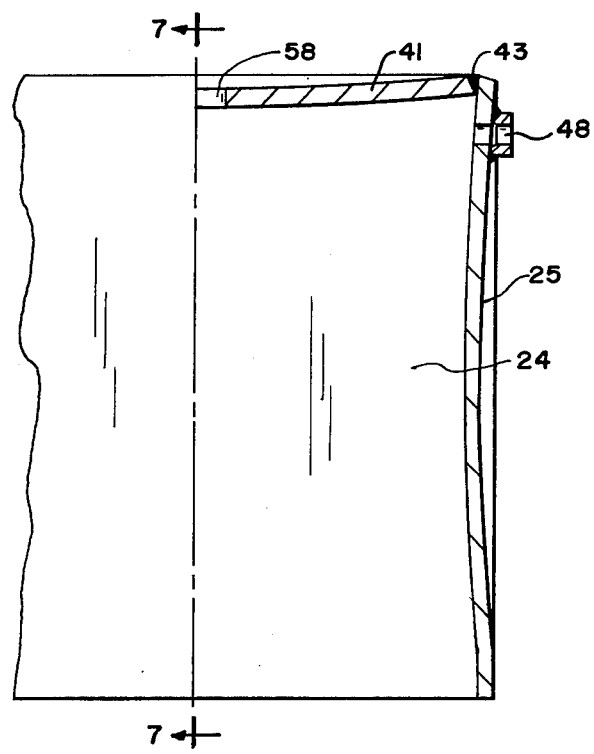
FIG. 6 is an elevational view, partly in section, showing a portion of an upper body extension after bulging by internal pressure.
Figure 7:
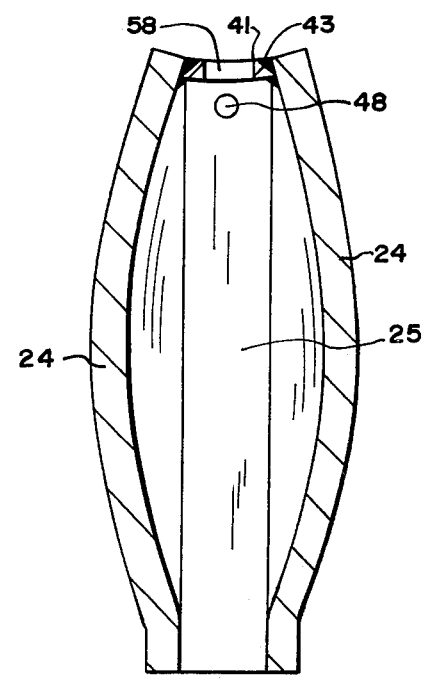
FIG. 7 is a cross-sectional view taken along the line 7—7 of FIG. 6.

FIGS. 6 and 7 show that part of the pressurized structure which is used to make the upper body extension. It will be seen that the closure wall 41 during the course of pressure forming has been bent from its original flat form, and that its exterior face is now concave. The other end of the body part is rectangular as viewed in bottom plan. This is because this portion was retained by the clamping members 51 during pressure forming. As shown in FIG. 15, the side walls 25 which were designated 35 in FIGS. 3, 4 and 14, have been bent during pressure forming, whereby they are likewise concave as viewed externally. This forming of the side walls 25 occurs because of the bending forces applied by the end walls 34, at the time these end walls are bulged outwardly to form the walls 24. Irrespective of these changes in form which occur during pressure forming, the profile of the upper body extension as shown in FIG. 6 remains substantially rectangular.

Figure 8:
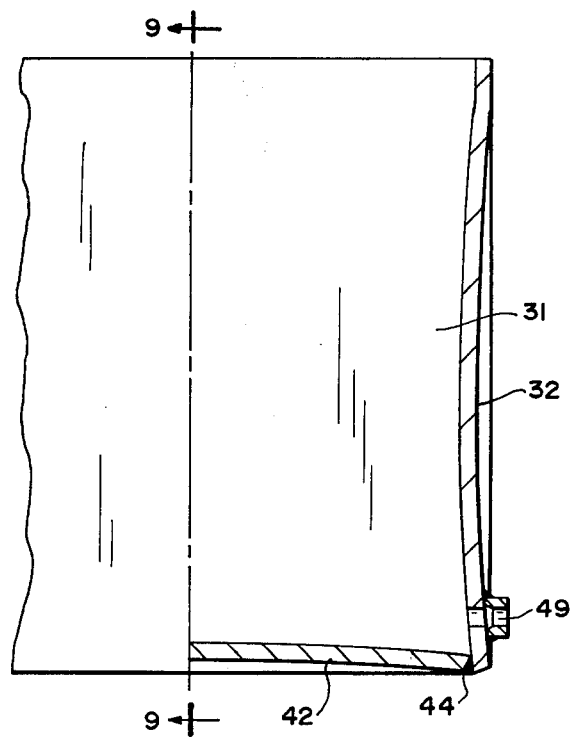
FIG. 8 is an elevational view, partly in section, showing a portion of a lower body extension after being pressure formed.
Figure 9:
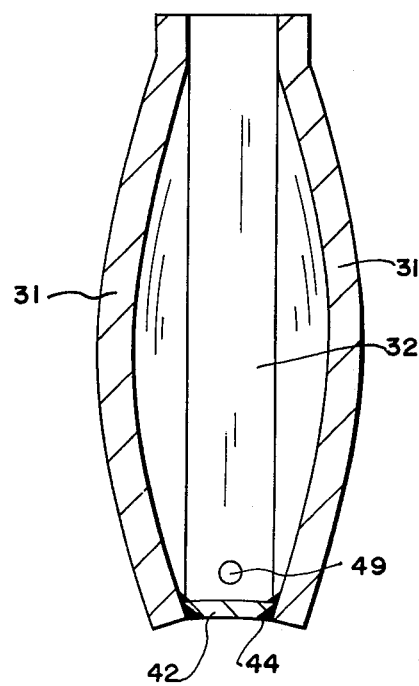
FIG. 9 is a cross-sectional view taken along the line 9—9 of FIG. 8.

The other part of the structure shown in FIGS. 3 and 4, after severance of the two parts, is shown in FIGS. 8 and 9. The closure wall 42 is again concave as viewed externally, being bent during pressure forming to substantially the shape shown in these figures. Here again the profile as viewed in FIG. 8 is substantially rectilinear. The other end of the lower extension is likewise rectangular as viewed in plan.

To complete the upper extension additional parts are applied as shown in FIGS. 10 and 11. Thus, the bolting flange 26 is secured to the rectangular end as by welding 56 and 57. An opening 58 is formed in the closure wall 41, and accommodates the short pipe or yoke section 59. Member 59 is secured to the closure wall 41 by welding, and its exterior end is secured by welding to the mounting pad 61, which may serve to mount a suitable valve operator, such as one of the manual or power type. Reinforcing members 62 are shown welded respectively to the pad 61 and the upper edges of the bulged end walls 24.

FIGS. 12 and 13 show additional items assembled with the part shown in FIGS. 8 and 9. Thus the foot plate 33 is welded to the lower extremities of the end walls 31. The flange 30 is welded to the other extremity.

Upon completion of the two extension assemblies they are assembled with the main body part in the manner shown in FIGS. 1 and 2. A power operator 62a of the hydraulic type may be mounted upon the pad 61 with its fluid pressure operated member directly connected to the operating rod 63 of the valve. Suitable sealing means 64 surrounding the operating rod 63 prevents leakage between the rod and the pad 61.

Because the upper and lower extensions are pressure formed, with the end walls being bulged outwardly, their weight for a given valve working pressure may be substantially less than similar extensions where the end walls are simple flat plates. This is because the bulged end walls approximate segments of a sphere, and therefore the extensions have some of the characteristics of a sphere in resisting internal pressure. However, the configuration of the valve body as viewed in FIG. 1 is essentially the same as a fabricated gate valve having upper and lower body extensions formed integral with the main body part. Although the bulged walls of the upper and lower extensions are evident when the valve is viewed from one side, this configuration does not increase the space requirements for installation of the valve, and it does not make the valve more difficult to handle or install.

As previously mentioned, the valve shown in FIGS. 1 and 2 employs upper and lower extensions, and a ported gate. The invention can also be used to advantage where the valve makes use of a short gate, without the lower body extension. In this event, the body extensions for two valves can be made simultaneously, and of the same length. The clamping members 51 in such event are placed midway between the ends of the structure shown in FIGS. 3 and 4.

The manner in which the structure of FIGS. 3 and 4 is welded together contributes to attainment of the desired pressure formed configuration, without weld breakage. Thus the internal welds 46 and 47 give sufficient strength to insure bending of closure walls 41 and 42 without weld breakage. The limited length of these welds prevents corner breakage. Also the fact that the end walls are thicker than the closure and side walls insures bending of the latter without weld breakage.

I claim:

1. In a gate valve construction, a valve body formed of at least two body parts, namely, a main body part and an upper body extension, the main body part having end walls provided with aligned openings forming flow passages, the body extension having its lower extremity secured to the upper extremity of the main body part whereby a vertically extending space is formed within the body to accommodate the gate, a valve gate disposed within the body space, sealing assemblies carried by the body and forming seals between the body and the surfaces of the gate, a bonnet assembly mounted on the upper extremity of the body extension, an operating rod connected to the gate and extending through the bonnet assembly, the body extension comprising end walls that are bulged outwardly and secured by welding along their edges to substantially parallel side walls, the side walls being arched inwardly, the upper extremity of the extension being substantially rectangular as viewed in plan, and an inwardly arched closure wall welded to said upper extremity of the extension and serving to close the same, said bonnet means being mounted on said upper closure member.

2. A valve construction as in claim 1 together with a lower body extension secured to the main body part, the lower extension comprising bulged end walls secured to inwardly arched side and bottom closure walls.

* * * * *